United States Patent
Bogren et al.

(10) Patent No.: US 9,984,564 B2
(45) Date of Patent: May 29, 2018

(54) METHOD AND AN ARRANGEMENT FOR COLLECTING AND PROCESSING DATA RELATED TO ROAD STATUS

(71) Applicant: ROADIT AB, Gothenburg (SE)

(72) Inventors: Jorgen Bogren, Askim (SE); Torbjorn Gustafsson, Gothenburg (SE)

(73) Assignee: KLIMATOR AB, Gothenburg (SE)

( * ) Notice: Subject to any disclaimer, the term of this patent is extended or adjusted under 35 U.S.C. 154(b) by 52 days.

(21) Appl. No.: 14/760,214

(22) PCT Filed: Jan. 22, 2014

(86) PCT No.: PCT/EP2014/051269
§ 371 (c)(1),
(2) Date: Jul. 10, 2015

(87) PCT Pub. No.: WO2014/114684
PCT Pub. Date: Jul. 31, 2014

(65) Prior Publication Data
US 2015/0356867 A1 Dec. 10, 2015

(30) Foreign Application Priority Data
Jan. 22, 2013 (EP) .................................... 13152243

(51) Int. Cl.
*G01C 21/36* (2006.01)
*G08G 1/01* (2006.01)

(52) U.S. Cl.
CPC ......... *G08G 1/0112* (2013.01); *G08G 1/0116* (2013.01); *G08G 1/0125* (2013.01);
(Continued)

(58) Field of Classification Search
None
See application file for complete search history.

(56) References Cited

U.S. PATENT DOCUMENTS

| 8,451,140 B2 * | 5/2013 | Piccinini et al. ............. 340/905 |
| 2002/0086681 A1 * | 7/2002 | Gilham ................ G08G 1/0104 455/456.6 |

(Continued)

FOREIGN PATENT DOCUMENTS

| EP | 2172377 | 4/2010 |
| WO | 2005007973 | 1/2005 |

OTHER PUBLICATIONS

International Search Report, dated Mar. 28, 2014, from corresponding PCT application.
(Continued)

*Primary Examiner* — Brent Swarthout
(74) *Attorney, Agent, or Firm* — Young & Thompson

(57) ABSTRACT

A method and arrangement for collecting and processing data related to road status of a network of roads, include: collecting a first set of data from a plurality of vehicles indicating surrounding conditions in the vicinity of each vehicle; collecting a second set of data indicating the position of each vehicle; collecting a third set of data from the stationary data collecting unit indicating the surrounding conditions in the vicinity of the data collecting unit; transferring the first, second and third sets of data to a central server unit being associated with a storage medium; interpreting in the server unit, the first set of data in combination with the second and third set of data such that improved and local information related to road status for a coverage area of the data collecting unit is provided; and providing the information related to the road status to the user.

23 Claims, 2 Drawing Sheets

(52) U.S. Cl.
CPC ......... *G08G 1/0129* (2013.01); *G08G 1/0133* (2013.01); *G08G 1/0141* (2013.01)

(56) References Cited

U.S. PATENT DOCUMENTS

| | | | | |
|---|---|---|---|---|
| 2014/0067265 A1* | 3/2014 | Maston | .............. | G01C 21/3697 |
| | | | | 701/533 |
| 2014/0114624 A1* | 4/2014 | Buchanan | ............... | G01W 1/02 |
| | | | | 703/2 |

OTHER PUBLICATIONS

Sukuvaara et al., "Wireless Traffic Service Platform for Combined Vehicle-to-Vehicle and Vehicle-to-Infrastructure Communications", IEEE Wireless Communications, vol. 16, No. 6, pp. 54-61 (Dec. 31, 2009) XP011286592.

Kwon, E., et al., "Agent-Based On-Line Traffic Condition and Information Analysis System for Wireless V2I Communication," Ubiquitous and Future Networks (ICUFN), Second International Conference on, IEEE, Jun. 2010, pp. 360-365.

Alcaraz, J., et al., "Control-Based Scheduling with QoS Support for Vehicle to Infrastructure Communications," Vehicular Wireless Networks, vol. 16, No. 6, Dec. 2009, pp. 32-39.

European Office Action issued in Application No. 13 152 243.5, dated Nov. 23, 2017.

* cited by examiner

METHOD AND AN ARRANGEMENT FOR COLLECTING AND PROCESSING DATA RELATED TO ROAD STATUS

TECHNICAL FIELD

The present invention relates to a method for collecting and processing data related to road status of a network of roads. It comprises a process of collecting data from a plurality of vehicles and data from a stationary data collecting unit and providing information related to said road status to at least one user.

TECHNICAL BACKGROUND

It is very important that our network of roads functions as well as possible. For companies and authorities whose ability to work relies directly on the status of the roads it is crucial that problems on certain roads are quickly fixed or at least that information regarding the road status is accessible to be able to plan new routes.

For drivers of police cars, ambulances and fire trucks, for whom it is important to get to a location as quick as possible, information about the conditions of the roads leading to that location can be a matter of life and death. With the information that a road is, for example, very icy or snowy the driver can decide whether another road might be faster or not.

For trucking companies and road maintenance companies it is an economical issue to know the status of road networks. Trucking companies can increase their efficiency by redirecting trucks to roads in good driving conditions. Maintenance companies can increase their efficiency by prioritising the roads that are in greatest need of maintenance.

Information regarding the condition and status of roads can obviously also be of high concern and importance also for the general public, i.e. for drivers of regular cars and other vehicles.

Permanent weather stations give information about the weather in their vicinity but they are unreliable; they are only about 60-70% correct. They are also most reliable in their direct vicinity, so for roads just a short distance away the weather information might be incorrect. For companies and authorities there is a need for improved weather information that is road specific and more accurate than the information received from weather stations.

The patent document EP 2172377 A1 discloses a method for processing data that has been collected from mobile units and permanent weather stations in an area of roads. The area is divided into sub-areas where each sub-area has at least one distinctive geographical feature or characteristic which affects the climate within the sub-area. The data from the mobile unit may include information relating to temperature, atmospheric pressure, humidity, if the windscreen wipers are on, if the ABS system is activated and so on. The information from the mobile units is combined with the information from the weather stations and with the information regarding a specific geographical feature in the sub-area. The geographical feature may for example be a river running alongside the road which increases the risk of ice in the road at certain weather conditions. EP 2172377 A1 provides a solution where specific road status is obtained in sub-areas with a distinctive geographical feature.

WO 2005/007973 A1 discloses an apparatus and a method for detecting and collecting values for a road friction dependent parameter at wheeled vehicles and transmitting the values to a central receiver for processing and re-transmitting. The values for road friction are used to determine the need for maintenance on specific roads. The values also help the driver to manually control the distribution of surface treatment substance dependent on the road status information the values indicate.

In a system which collects and processes data related to road status of a network of roads, where data is collected from a plurality of vehicles and from a stationary data collecting unit and where information related to said road status is provided to at least one user, there is a need to provide more local road status information.

A simplified system and method which provides local road status information without dividing all roads into small sub-areas is needed, i.e. a simplified way to get a more accurate and more local road status.

SUMMARY OF THE INVENTION

With the above description in mind, an aspect of the present invention is to provide a way to improve local road status information. Improved local road status information will greatly benefit authorities in maintenance planning. Police, ambulances, fire trucks and trucking companies will be better informed about the conditions on roads. The present invention also makes it possible to provide car drivers with information updates with local weather variations and road status of the road ahead.

The object of the present invention relates to collecting and processing data related to road status of a network of roads. It comprises a process of collecting data from a plurality of vehicles and data from a stationary data collecting unit and providing information related to said road status to at least one user.

A first aspect of the present invention relates to a method comprising the following steps:
  collecting a first set of data from said plurality of vehicles, said first set of data indicating surrounding conditions in the vicinity of each respective vehicle;
  collecting a second set of data indicating the position of each of said vehicles;
  collecting a third set of data from said stationary data collecting unit, said third set of data indicating the surrounding conditions in the vicinity of said data collecting unit;
  transferring said first, second and third sets of data to a central server unit being associated with a storage medium;
  in said server unit, interpreting said first set of data in combination with said second and third set of data such that improved and local information related to road status for the vicinity of said data collecting unit, is provided; and
  providing said information related to said road status to said user.

The method may further comprise that the surrounding conditions in the vicinity of the vehicles and the data collecting unit are weather and road conditions.

The method may further comprise that the first set of data comprises data indicating air pollution levels in the vicinity of the vehicles.

The method may further comprise to continuously collect and transfer new first and second sets of data to the server unit.

The method may further comprise that said server unit compares the new first and second sets of data with the previously transferred first and second sets of data to determine if there are differences in the data for indicating that there is a change in said road status.

The method may further comprise that said first set of data is provided by means of at least one of the following sensors in said vehicles:
- a sensor for detecting whether an ABS system in a vehicle is switched on or off;
- a sensor for detecting whether an anti-spin system in a vehicle is switched on or off;
- a sensor for detecting whether a windshield wiper in a vehicle is switched on or off;
- an outdoor temperature sensor;
- a sensor indicating the atmospheric air pollution in the vicinity of the vehicle; and
- an accelerometer detecting movements and vibrations being associated with the vehicle.

The method may further comprise that said second set of data is provided by means of a GPS sensor in each vehicle, or another equivalent sensor to be used in a navigation system for positioning.

The method may further comprise that said third set of data is provided by means of at least an arrangement for predicting the weather conditions in the vicinity of said stationary data collecting unit and at least one of the following sensors in said stationary data collecting unit:
- an outdoor, atmospheric air temperature sensor;
- a road surface temperature sensor;
- a sensor for detecting the presence of ice, snow or water on the surface of at least a part of said network of roads;
- a sensor for precipitation;
- a sensor for wind strength and/or wind direction; and
- a sensor for detecting fog.

It should be noted here that the term "stationary data collecting unit" refers to a data collecting unit which is intended to be unmoving, i.e. standing still, while operating according to the principles of this invention. However, even though it operates while standing still, the stationary data collecting unit may still be arranged to be transported between different sites, if necessary.

A second aspect of the present invention relates to an arrangement for processing data related to road status of a network of roads. The arrangement comprises means for collecting data from a plurality of vehicles and data from a stationary data collecting unit and means for providing information related to said road status to at least one user.

The arrangement for processing data may further comprise:
- means for collecting a first set of data from said plurality of vehicles, said first set of data indicating surrounding conditions in the vicinity of each respective vehicle;
- means for collecting a second set of data indicating the position of each of said vehicles;
- means for collecting a third set of data from said stationary data collecting unit, said third set of data indicating the surrounding conditions in the vicinity of said data collecting unit;
- means for transferring said first, second and third sets of data to a central server unit being associated with a storage medium;
- means for interpreting said first set of data in combination with said second and third set of data in said server unit, such that improved and local information related to road status for the vicinity of said data collecting unit, is provided; and
- means for providing said information related to said road status to said user.

The arrangement may further comprise that the surrounding conditions in the vicinity of the vehicles and the data collecting unit are weather and road conditions.

The arrangement may further comprise that the first set of data comprises data indicating air pollution levels in the vicinity of the vehicles.

The arrangement may further comprise means for continuously collecting and transferring new first and second sets of data to the server unit.

The arrangement may further comprise means for comparing the new first and second sets of data with the previously transferred first and second sets of data to determine if there are differences in the data for indicating that there is a change in said road status.

The arrangement may further comprise that the stationary data collecting unit is a weather station.

The arrangement may further comprise that said first set of data is provided by means of at least one of the following sensors in said vehicles:
- a sensor for detecting whether an ABS system in a vehicle is switched on or off;
- a sensor for detecting whether an anti-spin system in a vehicle is switched on or off;
- a sensor for detecting whether a windshield wiper in a vehicle is switched on or off;
- an outdoor temperature sensor;
- a sensor indicating the atmospheric air pollution in the vicinity of the vehicle; and
- an accelerometer detecting movements and vibrations being associated with the vehicle.

The arrangement may further comprise that said second set of data is provided by means of a GPS sensor in each vehicle, or another sensor to be used in a navigation system for positioning purposes.

The arrangement may further comprise that said third set of data is provided by means of at least an arrangement for predicting the weather conditions in the vicinity of said stationary data collecting unit and at least one of the following sensors in said stationary data collecting unit:
- an outdoor, atmospheric air temperature sensor;
- a road surface temperature sensor;
- a sensor for detecting the presence of ice, snow or water on the surface of at least a part of said network of roads;
- a sensor for precipitation;
- a sensor for wind strength and/or wind direction; and
- a sensor for detecting fog.

A third aspect of the present invention relates to a mobile device comprising means for receiving and presenting information related to road status obtained according to the method described above.

The mobile device may further comprise a display for presenting said information.

The mobile device may further comprise that said information is presented on a map and wherein the road conditions are marked.

An effect of that the server unit uses and combines all three sets of data when providing information related to road status is that the information may be made local and precise.

An effect of that the first set of data comprises data indication air pollution levels is that the information interpreted by the server unit can contain information regarding air pollution in specific areas. For example, if the level of air pollution is constantly high in an area it might be necessary and/or desirable to redirect some traffic away from that area.

An effect of comparing the new first and second sets of data with the previously transferred first and second sets of data is that, if there are differences in the data, it indicates that there is a change in said road status and thus more accurate and local road status information may be obtained.

The present invention makes use of several sensors that are already present on many vehicles which makes the method and arrangement easy and cheap to implement.

BRIEF DESCRIPTION OF FIGURES

Further objects, features, and advantages of the present invention will appear from the following detailed description of some embodiments of the invention, wherein some embodiments of the invention will be described in more detail with reference to the accompanying drawings, in which.

DETAILED DESCRIPTION OF EMBODIMENTS

Embodiments of the present invention will be described more fully hereinafter with reference to the accompanying drawing, in which an embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
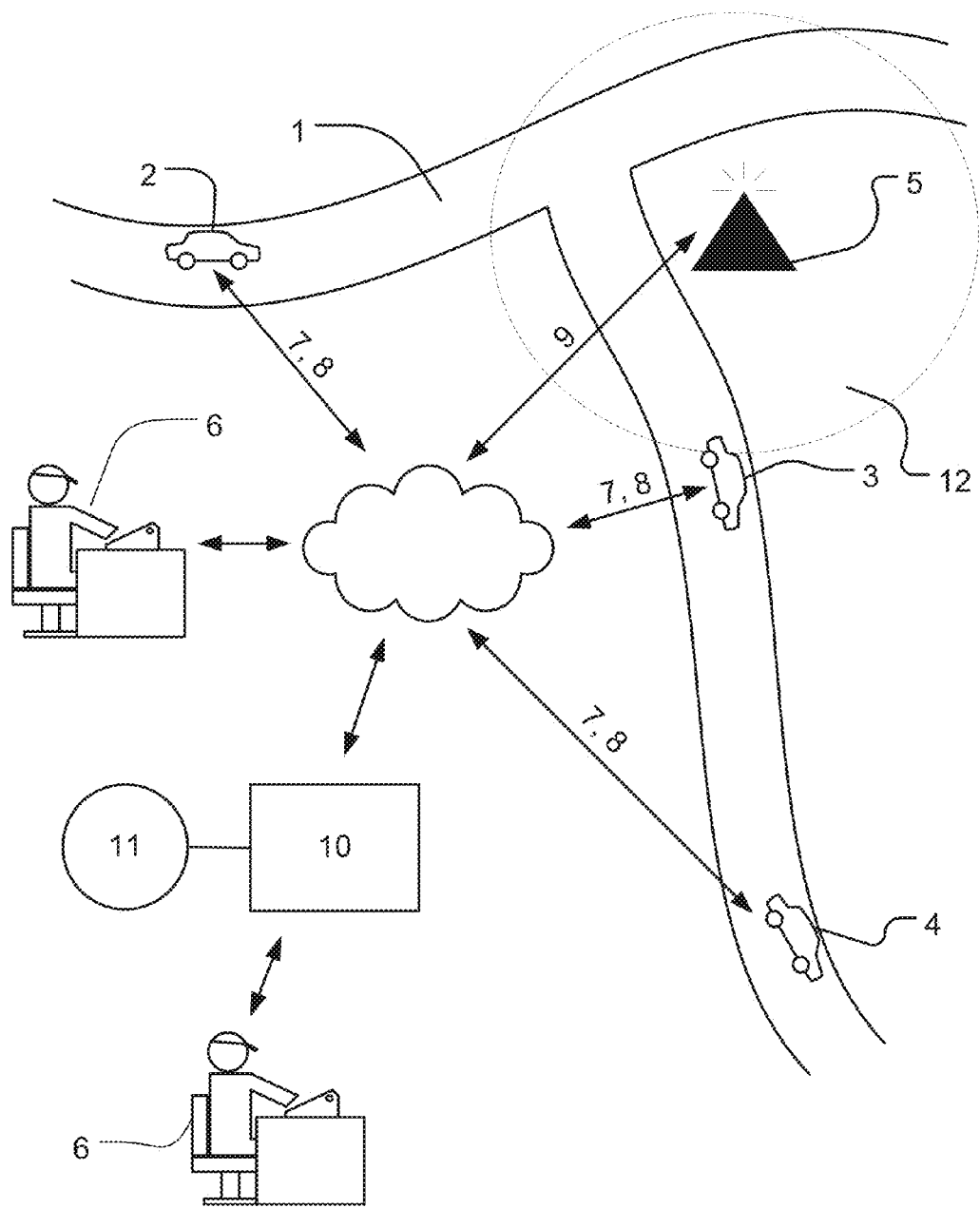
FIG. 1 shows an overview of an area in which the present invention is in use.

FIG. 1 shows an overview of an area where the present invention is in use. The present invention relates to collecting and processing data 7, 8, 9 related to road status of a network of roads 1. It comprises a process of collecting data from a plurality of vehicles 2, 3, 4 and data 9 from a stationary data collecting unit 5 and providing information related to said road status to at least one user 6.

According to the embodiment, the stationary data collecting unit 5 is a permanent weather station, i.e. a facility for observing weather conditions in order to prepare weather forecasts and to supply data relating, for example, to temperature, weather conditions and other atmospheric conditions.

The invention relates to both a method and an arrangement for carrying out the specifications below. A method for carrying out the invention comprises the following steps:
- collecting a first set of data 7 from said plurality of vehicles 2, 3, 4, said first set of data 7 indicating surrounding conditions in the vicinity of each respective vehicle 2, 3, 4;
- collecting a second set of data 8 indicating the position of each of said vehicles 2, 3, 4;
- collecting a third set of data 9 from said stationary data collecting unit 5, said third set of data 9 indicating the surrounding conditions in the vicinity 12 of said data collecting unit 5;
- transferring said first 7, second 8 and third 9 sets of data to a central server unit 10 being associated with a storage medium 11;
- in said server unit 10, interpreting said first set of data 7 in combination with said second 8 and third 9 set of data such that improved and local information related to road status for the vicinity of said data collecting unit 5, is provided; and
- providing said information related to said road status to said user.

According to the embodiment, the central server unit 10 is located and arranged so that it may communicate wirelessly with the vehicles 2, 3, 4, the stationary data collecting unit 5 and the user 6, suitably via an internet-based communication line and using mobile communication units. Such communication is previously known as such, and for this reason it is not described in any detail here.

As indicated in FIG. 1, the term "user" 6 can be used to describe several types of users, for example a user which is in direct contact with vehicles 2, 3, 4 and with a stationary data collecting unit 5, suitably via a telephone network (as indicated schematically by means of a "cloud" in FIG. 1). Also, the term "user" 6 can be used to indicate a user which receives information from the central server unit 10, suitably via a wireless network system as also indicated in FIG. 1. A user 6 may communicate via a fixed computer station or, alternatively, via a wireless, mobile device. Such a mobile device can be in the form of a laptop computer, a tablet computer, a mobile telephone or a similar unit.

The first set of data 7 from each vehicle 2, 3, 4 can be in the form of information relating to the operation of certain components such as ABS braking systems, windshield wipers, anti-spin systems and similar indicators. Furthermore, the first set of data 7 may comprise information from an accelerometer detecting movements and vibrations being associated with the vehicle. An ABS system sensor may be used to detect whether a vehicle skids or slips on the road surface, which can be an indication of snow or ice on a road surface. A similar form of sensor system which can be used is a so-called electronic stability control (ESC) system, which is configured to detect and to reduce any occurring loss of traction, such as for example during skidding of a vehicle.

Furthermore, an accelerometer can be used as a sensor in a vehicle in order to detect whether there are excessive vibrations or movements (in the x-, y- or z-directions) of a vehicle, which can be an indication of inferior road conditions, gravel or mud on the road surface, potholes or disruptions in the road, or similar conditions.

Also, said first set of data 7 may comprise information from an outdoor temperature sensor and an atmospheric air pollution sensor. The components and sensors mentioned are not shown specifically in the appended drawing. In summary, said first set of data 7 indicates conditions in the surrounding environment of each vehicle 2, 3, 4 which relate to road conditions and weather conditions.

Furthermore, the above-mentioned second set of data 8 comprises, according to the embodiment, information which indicates the position of each of said vehicles 2, 3, 4. Such information is suitably provided by means of a so-called GPS sensor provided in each of the vehicles 2, 3, 4.

Furthermore, the above-mentioned third set of data 9 from the stationary data collecting unit 5 is suitably in the form of information relating to temperature, weather conditions and other atmospheric conditions in the vicinity of the data collecting unit 5, for example in the form of information regarding precipitation, fog, mist, wind strength and wind direction. In other words, the third set of data 9 comprises information regarding the surrounding conditions in the vicinity 12 of the data collecting unit 5.

When the server unit 10 interprets the first, second and third sets of data 7, 8, 9 in combination, the server unit can draw conclusions that improve the already existing information from the stationary data collecting unit 5. For example, if the stationary data collecting unit 5 indicates that there is snow in its vicinity and one or several vehicles 2, 3, 4 in its vicinity indicate that their ABS-systems are activated (which indicates that certain vehicles have been skidding); the conclusion is that there is high possibility of snow on the roads. This, in turn, indicates that the roads in that specific area can be difficult to drive on.

If, on the other hand, the stationary data collecting unit 5 does not indicate snow but one or several cars in its vicinity indicate that the ABS-system is activated, a conclusion can be drawn that the vehicles have been skidding due to some other reason that snow or ice on the road surface, which for example can be due to slippery materials such as oil on the road surface, which induces the car to activate the ABS-system. Another case is when the stationary data collecting unit 5 indicates snow in the area and one or more vehicles do not indicate that their ABS-system is activated. Then a conclusion can be drawn that the area is covered in snow but that the snow on the roads of the vicinity of the stationary data collecting unit is hard packed snow, or the like, which does not make the car wheels spin.

The way that the server unit 10 interprets the first, second and third data sets 7, 8, 9 by combining their information and drawing conclusions based on the combination may provide for a way to improve information regarding road status in the vicinity of the data collecting unit 5. Statistically, the information regarding the weather from the data collecting unit 5 is only about 60-70% correct and by using the method described above, weather information in the vicinity of the data collecting unit 5 may be made more statistically correct.

The user of the present invention is anyone who is interested in the road status of specific roads. The user may be any one of police, road maintenance staff, ambulance staff, trucking staff or fire department staff or anyone from the authorities that need information about the road status. The user can also be a regular person driving a vehicle, i.e. a member of the general public who is interested in obtaining information related to the road status of a network of roads.

The vehicles 2, 3, 4 and the stationary data collecting unit 5 both have means for transmitting the information they collect wirelessly, for example via a telecommunications unit.

Since the second set of data 8 includes the position of the vehicle, the present invention also makes it possible to produce road status information in areas not covered by the stationary data collecting units 5. The information is then not a combination of all three sets of data 7, 8, 9 but only of the two first. The information obtained in this way is not as reliable as the information from a combination of all three sets but can even so give an indication of the road status on roads not covered by a stationary data collecting unit.

The method and the arrangement may further comprise that the surrounding conditions in the vicinity of the vehicles 2, 3, 4 and the data collecting unit 5 are weather and road conditions. The first set of data 7 from the vehicles may include data indication if the ABS system is switched on or off, if the wipers are on or off, if the anti-spin system is on or off, temperature in the air around the vehicles or on the road, humidity levels in the air and/or friction on the road. The third set of data 9 from the data collecting unit 5 may include information about temperature, road conditions, humidity and/or air pressure.

The method and the arrangement may further comprise that the first set of data 7 comprises data indicating air pollution levels in the vicinity of the vehicles 2, 3, 4. By including data that indicates air pollution levels in the first set of data, it is possible to draw conclusions regarding the environment in the vicinity of the vehicle. For example, in an area where one or more vehicles indicate high air pollution levels it might be desirable to redirect some traffic or take other precautionary actions to avoid that the air pollution has a large effect on the environment in the area. It may also give an indication about if there is a lot of traffic on the specific road that the vehicles are indicating high levels of air pollution from.

The method and the arrangement may further comprise to continuously collect and transfer new first and second sets of data 7, 8 to the server unit 10. To be able to compare new sets of data with old, or previously sent data, new sets of data must be continuously collected and transferred.

The method and the arrangement may further comprise that said server unit 10 compares the new first and second sets of data 7, 8 with the previously transferred first and second sets of data to determine if there are differences in the data for indicating that there is a change in said road status.

By continuously updating the first, second and third sets of data 7, 8, 9 the improved information related to road status can also be continuously updated. When the second set of data 8 indicates a new position of a vehicle 2, 3, 4 compared with last set of data, any differences between the information in the previous first set of data 7 and the updated first set of data are noted. By comparing the information, the information related to road status may be very local. The information may, for example, be as local as indicating a specific patch of road that is covered in ice. In other words, by combining the first, second and third sets of data and continuously updating the sets of data and comparing old set with new sets extremely local information about road conditions can be obtained. The combination indicates that there is a change in said road status and thus more accurate and local road status information may be obtained. Continuously updating the sets of data comprises that new sets of data is sent at short intervals, for example 5 new sets per second.

The first set of data 7 may be provided by means of at least one of the following sensors in said vehicles 2, 3, 4:
  a sensor for detecting whether an ABS system in a vehicle is switched on or off;
  a sensor for detecting whether an anti-spin system in a vehicle is switched on or off;
  a sensor for detecting whether a windshield wiper in a vehicle is switched on or off;
  an outdoor temperature sensor;
  a sensor indicating the atmospheric air pollution in the vicinity of the vehicle; and
  an accelerometer detecting movements and vibrations being associated with the vehicle.

The present invention makes use of several sensors that are already present on many vehicles which makes the method and arrangement easy and cheap to implement.

The first set of data 7 may be provided by means of at least an outdoor air pollution sensor in said vehicles 2, 3, 4. Outdoor air pollution sensors are present in many vehicles today but on new cars their number is expected to rise.

The second set of data 8 may be provided by means of a GPS sensor in each vehicle. A GPS sensor is something which is present in most cars produced today.

The third set of data 9 may be provided by means of at least an arrangement for predicting the weather conditions in the vicinity of said stationary data collecting unit 5 and at least one of the following sensors in said stationary data collecting unit:
  an outdoor, atmospheric air temperature sensor;
  a road surface temperature sensor;
  a sensor for detecting the presence of ice, snow or water on the surface of at least a part of said network of roads;
  a sensor for precipitation;

a sensor for wind strength and/or wind direction; and
a sensor for detecting fog.

These sensors are sensors that are present in most data collecting units. They may also have sensors for measuring the humidity in the air and/or air pressure.

The effects of using the means described below are described above when discussing the method steps using the corresponding means.

The arrangement for carrying out the above discussed method may comprise:

means for collecting a first set of data from said plurality of vehicles, said first set of data indicating surrounding conditions in the vicinity of each respective vehicle;

means for collecting a second set of data indicating the position of each of said vehicles;

means for collecting a third set of data from said stationary data collecting unit, said third set of data indicating the surrounding conditions in the vicinity of said data collecting unit;

means for transferring said first, second and third sets of data to a central server unit being associated with a storage medium;

means for interpreting said first set of data in combination with said second and third set of data in said server unit, such that improved and local information related to road status for the vicinity of said data collecting unit, is provided; and means for providing said information related to said road status to said user.

The arrangement may further comprise that the stationary data collecting unit is a weather station. Weather stations are positioned spaced apart so that they cover most areas where there are networks of roads. A typical weather station has many different sensors for obtaining information about the weather in its vicinity. For example temperature sensors, air pressure sensors, humidity sensors and so on. Weather stations also have systems for transmitting the information they collect to different users who might be interested in the weather in the specific area of a weather station.

Figure 2:
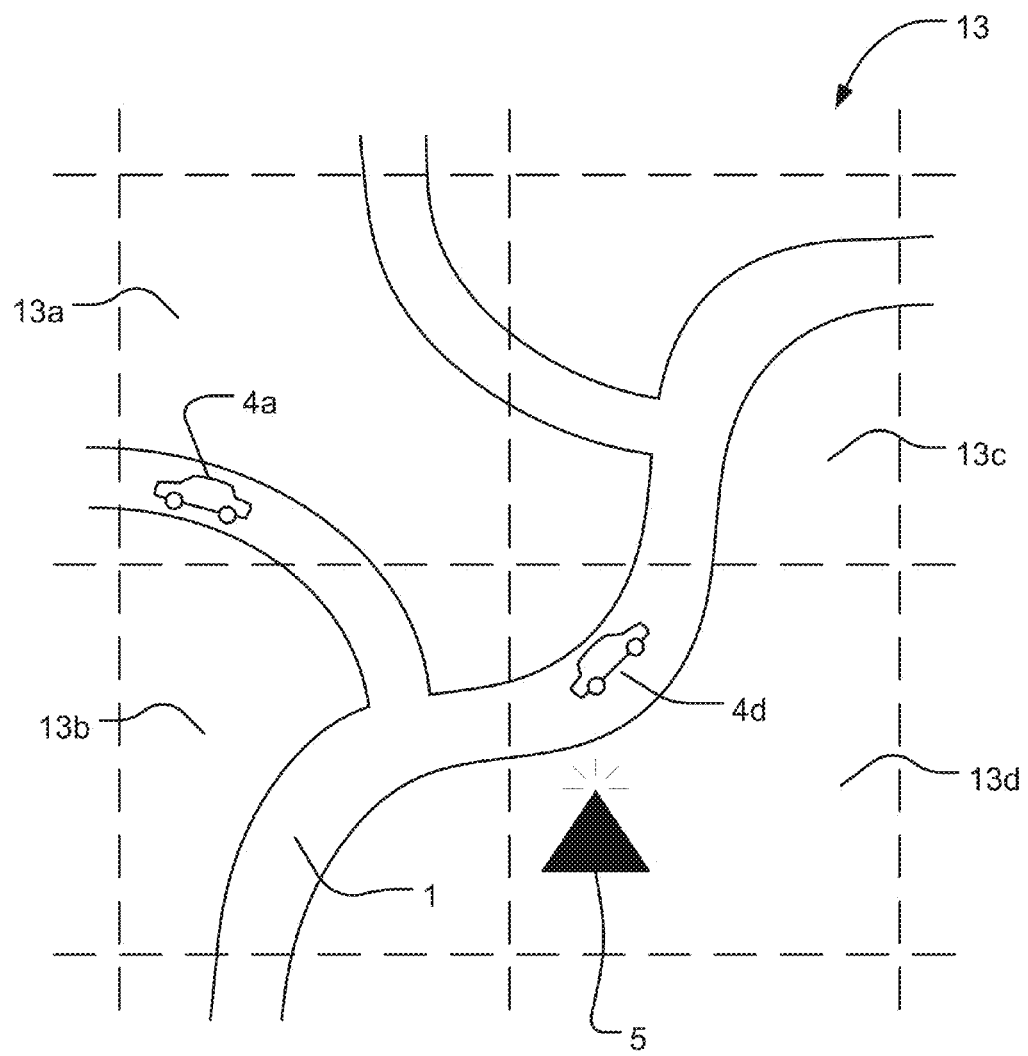
FIG. 2 shows a grid network in which the invention can be used for providing a weather and road status forecast.

An embodiment of the invention is shown in FIG. 2, which is a simplified grid net 13 of a geographical area. According to this simplified example, the grid net 13 consists of four different areas or sections 13a, 13b, 13c, 13d, through which a number of roads 1 extend. The principles for collecting and processing data related to the road status of these roads 1 are the same as described above.

FIG. 2 is used to indicate an aspect of the invention in which information from different sources is used in a predetermined schedule in order to predict said road status by providing a forecast of the weather and road status. More precisely, in a first step, information related to the different areas 13a, 13b, 13c, 13d regarding weather conditions (i.e. air temperature, wind conditions, fog, rain and snow conditions etc.) is provided. This is normally carried out by ordering such information from institutions such as government agencies and commercial weather forecast providers.

Using the information from said first step, a preliminary forecast regarding the weather and road status is provided, for example for a time period extending for a few days. As a second step, the third set of data from a stationary data collecting unit (5) is used for confirming the forecast from the first step and for improving the accuracy of said forecast.

As a third step—in order to further improve the accuracy of the forecast—the information corresponding to the first set of data described above is used. This means that actual information from vehicles being positioned within the grid net is used. In particular, information from vehicles 4a within the first area 13a is used for improving the forecast for this particular first area 13a, whereas information from one or more vehicles 4d is used for improving the forecast for the fourth area 13d.

With the above-mentioned process for providing a weather and road status forecast, a highly accurate model is provided which uses various sets of information from different sources.

A mobile device may be used for receiving and presenting information related to the road status obtained according to the method described above. By presenting the information in a mobile device the information is easily accessible to users who are not in an office all day. Information regarding a change in the road status reaches the user fast even if they are not in an office.

The mobile device may further comprise a display for presenting said information. Presenting the information on a display makes it possible to use graphical illustrations which make the information easier to interpret.

The mobile device may further comprise that said information is presented on a map and wherein the road conditions are marked. If a user is out, for example driving a vehicle, and the information is presented on a map indicating the road conditions on the road up ahead, it is easy for the user to make quick decisions for how to continue to drive. The roads on the map can for example be colour marked; a red road might indicate that the road has bad driving conditions.

The term mobile device is used herein to include all kinds of portable electronic devices such as any type of mobile phone, laptops (such as standard, ultra portables, net books, micro laptops, and pads), handheld computers, tablet computers, PDAs, gaming devices, accessories to mobile phones, etc. However, for the sake of clarity and simplicity, the embodiments outlined in this specification are only exemplified with and related to mobile devices.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method for collecting and processing data related to road status of a network of roads, comprising:
   collecting a first set of data from a plurality of vehicles, said first set of data indicating surrounding conditions in a vicinity of each respective vehicle;
   collecting a second set of data indicating a position of each of said vehicles;
   collecting a third set of data from a stationary data collecting unit, said third set of data indicating surrounding conditions in a vicinity of said data collecting unit;
   transferring said first, second and third sets of data to a central server unit associated with a storage medium;
   in said server unit, interpreting said first set of data in combination with said second and third set of data such that improved and local information related to road status for a coverage area of said data collecting unit, is provided, the interpreting including establishing a grid of a geographical area, the grid comprising a plurality of areas, information from a particular vehicle within a given area in the grid being used for improving a forecast for the given area, and the third set of data from the stationary data collecting unit being used for confirming and improving accuracy of a preliminary forecast from an institution; and
   providing said information related to said road status to said user.

2. The method according to claim 1, wherein the surrounding conditions in the vicinity of the vehicles and the data collecting unit are weather and road conditions.

3. The method according to claim 1, wherein the first set of data comprises data indicating air pollution levels in the vicinity of the vehicles.

4. The method according to claim 1, wherein the method further comprises to continuously collect and transfer new first and second sets of data to the server unit.

5. The method according to claim 4, wherein said server unit compares the new first and second sets of data with the previously transferred first and second sets of data to determine if there are differences in the data for indicating that there is a change in said road status.

6. The method according to claim 1, wherein said first set of data is provided by means of at least one of the following sensors in said vehicles:
   a sensor for detecting whether an ABS system in a vehicle is switched on or off;
   a sensor for detecting whether an anti-spin system in a vehicle is switched on or off;
   a sensor for detecting whether a windshield wiper in a vehicle is switched on or off;
   an outdoor temperature sensor; and
   a sensor indicating the atmospheric air pollution in the vicinity of the vehicle.

7. The method according to claim 3, wherein said first set of data is provided by means of at least the following sensor in said vehicles:
   an outdoor air pollution sensor.

8. The method according to claim 1, wherein said second set of data is provided by means of a GPS sensor in each vehicle or another sensor to be used in a navigation system for positioning.

9. The method according to claim 1, wherein said third set of data is provided by means of at least an arrangement for predicting the weather conditions in the vicinity of said stationary data collecting unit and at least one of the following sensors in said stationary data collecting unit:
   an outdoor, atmospheric air temperature sensor;
   a road surface temperature sensor;
   a sensor for detecting the presence of ice, snow or water on the surface of at least a part of said network of roads;
   a sensor for precipitation;
   a sensor for at least one of wind strength or wind direction; and
   a sensor for detecting fog.

10. The method according to claim 1, wherein a weather and road status forecast for the grid is provided by means of the following steps:
    providing weather and road status forecast data in the plurality of areas of said grid; and
    additionally providing information based on said third set of data and information based on said first set of data for further confirming said forecast data.

11. An arrangement for processing data related to road status of a network of roads, the arrangement comprising:
    means for collecting a first set of data from a plurality of vehicles, said first set of data indicating surrounding conditions in a vicinity of each respective vehicle;
    means for collecting a second set of data indicating a position of each of said vehicles;
    means for collecting a third set of data from a stationary data collecting unit, said third set of data indicating the surrounding conditions in a vicinity of said data collecting unit;
    means for transferring said first, second and third sets of data to a central server unit associated with a storage medium;
    means for interpreting said first set of data in combination with said second and third set of data in said server unit, such that improved and local information related to road status for the vicinity of said data collecting unit, is provided, the interpreting including establishing a grid of a geographical area, the grid comprising a plurality of areas, information from a particular vehicle within a given area in the grid being used for improving a forecast for the given area, and the third set of data from the stationary data collecting unit being used for confirming and improving accuracy of a preliminary forecast from an institution; and
    means for providing said information related to said road status to said user.

12. The arrangement according to claim 11, wherein the surrounding conditions in the vicinity of the vehicles and the data collecting unit are weather and road conditions.

13. The arrangement according to claim 11, wherein the first set of data comprises data indicating air pollution levels in the vicinity of the vehicles.

14. The arrangement according to claim 11, further comprising means for continuously collecting and transferring new first and second sets of data to the server unit.

15. The arrangement according to claim 14, further comprising means for comparing the new first and second sets of data with the previously transferred first and second sets of data to determine if there are differences in the data for indicating that there is a change in said road status.

16. The arrangement according to claim 11, wherein the stationary data collecting unit is a weather station.

17. The arrangement according to claim 11, wherein said first set of data is provided by means of at least one of the following sensors in said vehicles:
    a sensor for detecting whether an ABS system in a vehicle is switched on or off;

a sensor for detecting whether an anti-spin system in a vehicle is switched on or off;

a sensor for detecting whether a windshield wiper in a vehicle is switched on or off;

an outdoor temperature sensor; and a sensor indicating the atmospheric air pollution in the vicinity of the vehicle.

18. The arrangement according to claim 13, wherein said first set of data is provided by means of at least an outdoor air pollution sensor in said vehicles.

19. The arrangement according to claim 11, wherein said second set of data is provided by means of a GPS sensor in each vehicle or another sensor to be used in a navigation system for positioning.

20. The arrangement according to claim 11, wherein said third set of data is provided by means of at least an arrangement for predicting the weather conditions in the vicinity of said stationary data collecting unit and at least one of the following sensors in said stationary data collecting unit:

an outdoor, atmospheric air temperature sensor;

a road surface temperature sensor;

a sensor for detecting the presence of ice, snow or water on the surface of at least a part of said network of roads;

a sensor for precipitation;

a sensor for at least one of wind strength or wind direction; and a sensor for detecting fog.

21. A mobile device comprising means for receiving and presenting information related to road status obtained according to the method of claim 1.

22. The mobile device according to claim 21, wherein the mobile device comprises a display for presenting said information.

23. The mobile device according to claim 22, wherein said information is presented on a map and wherein the road conditions are marked on said map.

* * * * *